United States Patent
Son et al.

(10) Patent No.: US 9,591,592 B2
(45) Date of Patent: Mar. 7, 2017

(54) APPARATUS AND METHOD FOR CONTROLLING TRANSMISSION POWER IN CAN COMMUNICATION

(71) Applicant: ELECTRONICS AND TELECOMMUNICATIONS RESEARCH INSTITUTE, Daejeon (KR)

(72) Inventors: Kyo Hoon Son, Daejeon (KR); Byeong Cheol Choi, Daejeon (KR); Se Han Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 9 days.

(21) Appl. No.: 14/600,311

(22) Filed: Jan. 20, 2015

(65) Prior Publication Data
US 2015/0208365 A1    Jul. 23, 2015

(30) Foreign Application Priority Data
Jan. 21, 2014 (KR) .................. 10-2014-0007081

(51) Int. Cl.
  *H04W 52/28* (2009.01)
(52) U.S. Cl.
  CPC ................. *H04W 52/281* (2013.01)
(58) Field of Classification Search
  CPC .................................. H04W 52/281
  See application file for complete search history.

(56) References Cited

U.S. PATENT DOCUMENTS

| | | | | |
|---|---|---|---|---|
| 6,098,109 A | * | 8/2000 | Kotzur | H04L 45/745 370/911 |
| 8,095,812 B2 | | 1/2012 | Cho et al. | |
| 2002/0117860 A1 | * | 8/2002 | Man | B60K 6/365 290/46 |
| 2009/0104900 A1 | * | 4/2009 | Lee | H04B 1/0475 455/418 |
| 2010/0115302 A1 | | 5/2010 | Cho et al. | |
| 2011/0187193 A1 | * | 8/2011 | Pan | H02J 3/14 307/39 |
| 2013/0282946 A1 | * | 10/2013 | Ricci | G06F 13/4004 710/306 |
| 2014/0142801 A1 | * | 5/2014 | Shah | H04L 43/065 701/32.7 |
| 2014/0277926 A1 | * | 9/2014 | Singh | B60C 23/04 701/34.4 |

(Continued)

FOREIGN PATENT DOCUMENTS

KR    10-2007-0049508 A    5/2007
KR    10-2010-0048058 A    5/2010

*Primary Examiner* — Bobbak Safaipour
(74) *Attorney, Agent, or Firm* — Rabin & Berdo, P.C.

(57) ABSTRACT

Disclosed is a device for controlling transmission power in CAN communication, including: a controller area network (CAN) interface configured to receive transmitted data through a CAN BUS; a message priority management unit configured to read an arbitration ID included in the received data, and determine a priority of the received data; and a transmission power level selection unit configured to determine a transmission power level according to the priority.

15 Claims, 6 Drawing Sheets

(56) References Cited

U.S. PATENT DOCUMENTS

2014/0281752 A1* 9/2014 Keating .............. G06F 11/0757
                                              714/56
2015/0033016 A1* 1/2015 Thornton .............. H04L 9/0825
                                              713/171
2015/0212958 A1* 7/2015 Hara ................... H04L 12/4625
                                              710/116

* cited by examiner

CAN PROTOCOL DATA FRAME

APPARATUS AND METHOD FOR CONTROLLING TRANSMISSION POWER IN CAN COMMUNICATION

CROSS-REFERENCE TO RELATED APPLICATIONS

This application claims priority to and the benefit of Korean Patent Application No. 10-2014-0007081 filed in the Korean Intellectual Property Office on Jan. 21, 2014, the entire contents of which are incorporated herein by reference.

TECHNICAL FIELD

The present invention relates to an apparatus and a method of controlling transmission power in CAN communication, and more particularly, to an apparatus and a method of controlling transmission power in CAN communication, which control a size of transmission power of a wireless communication device by using a priority of each data message of a CAN protocol.

BACKGROUND ART

A vehicle is a manufactured machine configured of the great number of components. A configuration of the vehicle may be generally divided into two parts, a vehicle body which is an outer part of the vehicle, and a chassis in which various devices of the vehicle are organically connected. Further, recently, electronic units inside the vehicle performing various functions, as well as various devices configuring the chassis, form a network with each other. The components related to the network are about 30% or more of the components configuring the vehicle to occupy significant parts in the configuration of the vehicle.

The configuration of the network of the vehicle includes a sensor unit for detecting a vehicle state, a processing unit (node) for processing a sensor signal, a controller (actuator) for controlling a function of the vehicle, and a communication protocol for connecting the sensor unit, the processing unit, and the controller according to a purpose and transmitting data. The communication protocol used in a currently commercialized vehicle includes a CAN, a LIN, a MOST, and the like. Among them, CAN is an abbreviation of a "Controller Area Network", and CAN communication technology is technology representatively and widely used among vehicle network protocols. The CAN communication technology is a wired communication method developed so as to respond to electronization of the vehicle and increase in a system, and secure reliability in a vehicle communication environment in which electric noise is much generated. The CAN communication technology was first developed for the vehicle, but, currently, has been widely used over a general industry. Recently, the number of various devices for convenience included in the vehicle for satisfying increasing demands of a user is increased according to development of a vehicle technology, and thus the number of wires connecting the various devices is rapidly increased. As the number of wires inside the vehicle is increased, various problems, such as decrease in fuel efficiency of the vehicle and increase in problem rates of various devices, are generated, and in order to solve the problems, research on replacement of an existing wired network to a wireless network has been actively conducted.

Particularly, a network of the vehicle itself using near field communication technology, such as WPAN and LAN may be connected with an existing CAN BUS by using a CAN interface to exchange information with another system. Power may be supplied to a gateway and each node configuring a wireless sensor network for the vehicle through connection with a battery of the vehicle or batteries of the gateway and the node. Accordingly, since the amount of power is limited in both methods, a power management function for making devices minimally use power is essentially demanded.

SUMMARY OF THE INVENTION

The present invention has been made in an effort to provide an apparatus and a method of controlling communication power in CAN communication, which assign a priority according to importance of CAN protocol data, improve a reception rate of data having a high priority by controlling power of transmission output according to the corresponding priority, and control the amount of power used of the entirety of a wireless network system by making data with a lower priority use minimal transmission power.

An exemplary embodiment of the present invention provides a device for controlling transmission power in CAN communication, including: a controller area network (CAN) interface configured to receive transmitted data through a CAN BUS; a message priority management unit configured to read an arbitration ID included in the received data, and determine a priority of the received data; and a transmission power level selection unit configured to determine a transmission power level according to the priority.

The device may further include: a signal modulation unit configured to modulate the received data into a signal for wireless communication; and an RF signal transmitter configured to wirelessly radiate the modulated signal according to the determined transmission power level.

The wireless communication may be WPAN wireless communication, and the signal modulation unit may modulate the received data into a WPAN signal.

The transmission power level selection unit may determine the transmission power level for radiating the modulated signal among a plurality of preset transmission power levels according to the priority.

The arbitration ID may classify the priority by 11 bits or 19 bits, and may be sequentially arranged according to importance of the received data.

Another exemplary embodiment of the present invention provides a device for controlling transmission power in CAN communication, including: a data generation unit configured to generate data which is to be transmitted to a CAN BUS; a message priority management unit configured to read an arbitration ID included in the generated data, and determine a priority of the generated data; and a transmission power level selection unit configured to determine a transmission power level according to the priority.

The device may further include: a signal modulation unit configured to modulate the generated data into a signal for wireless communication; and an RF signal transmitter configured to wirelessly radiate the modulated signal according to the determined transmission power level.

The wireless communication may be WPAN wireless communication, and the signal modulation unit may modulate the generated data into a WPAN signal.

The transmission power level selection unit may determine the transmission power level for radiating the modulated signal among a plurality of preset transmission power levels according to the priority.

The arbitration ID may classify the priority by 11 bits or 19 bits, and may be sequentially arranged according to importance of the generated data.

Yet another exemplary embodiment of the present invention provides a method of controlling transmission power in CAN communication, including: reading an arbitration ID included in data used in CAN communication; determining a priority of the data through the read arbitration ID, and determining a transmission power margin according to the priority; and determining a transmission power level by adding the transmission power margin to preset reference power.

According to the exemplary embodiments of the present invention, the apparatus and the method of controlling communication power in CAN communication may assign a priority according to importance of CAN protocol data, improve a reception rate of data having a high priority by controlling power of transmission output according to the corresponding priority, and control the amount of power used of the entirety of a wireless network system by making data with a lower priority use minimal transmission power.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Various advantages and features of the present invention and methods accomplishing thereof will become apparent from the following description of embodiments with reference to the accompanying drawings. However, the present invention is not limited to the exemplary embodiments described herein, and may be specified in other forms. However, the present exemplary embodiments are provided for describing the present invention in detail so that those skilled in the art may easily work the technical spirit of the present invention.

In the drawings, the exemplary embodiments of the present invention are not limited to the illustrated specific form, but are exaggerated for clarity. Herein, specific terms have been used, but are just used for the purpose of describing the present invention and are not used for defining the meaning or limiting the scope of the present invention, which is disclosed in the appended claims.

In the present specification, an expression "and/or" is used as a meaning that at least one of the enumerated constructional elements is included. Further, an expression "coupled to/assembled with" is used as a meaning that one constructional element is directly coupled to another constructional element or indirectly connected to another constructional element through another constructional element. Unless particularly stated otherwise in the present specification, a singular form also includes a plural form. Further, a constructional element, a step, an operation, and an element mentioned with "include" or "including" used in the specification means existence or addition of one or more other constructional elements, steps, operations, and elements.

Hereinafter, an exemplary embodiment of the present invention will be described in detail with reference to the accompanying drawings.

Figure 1:
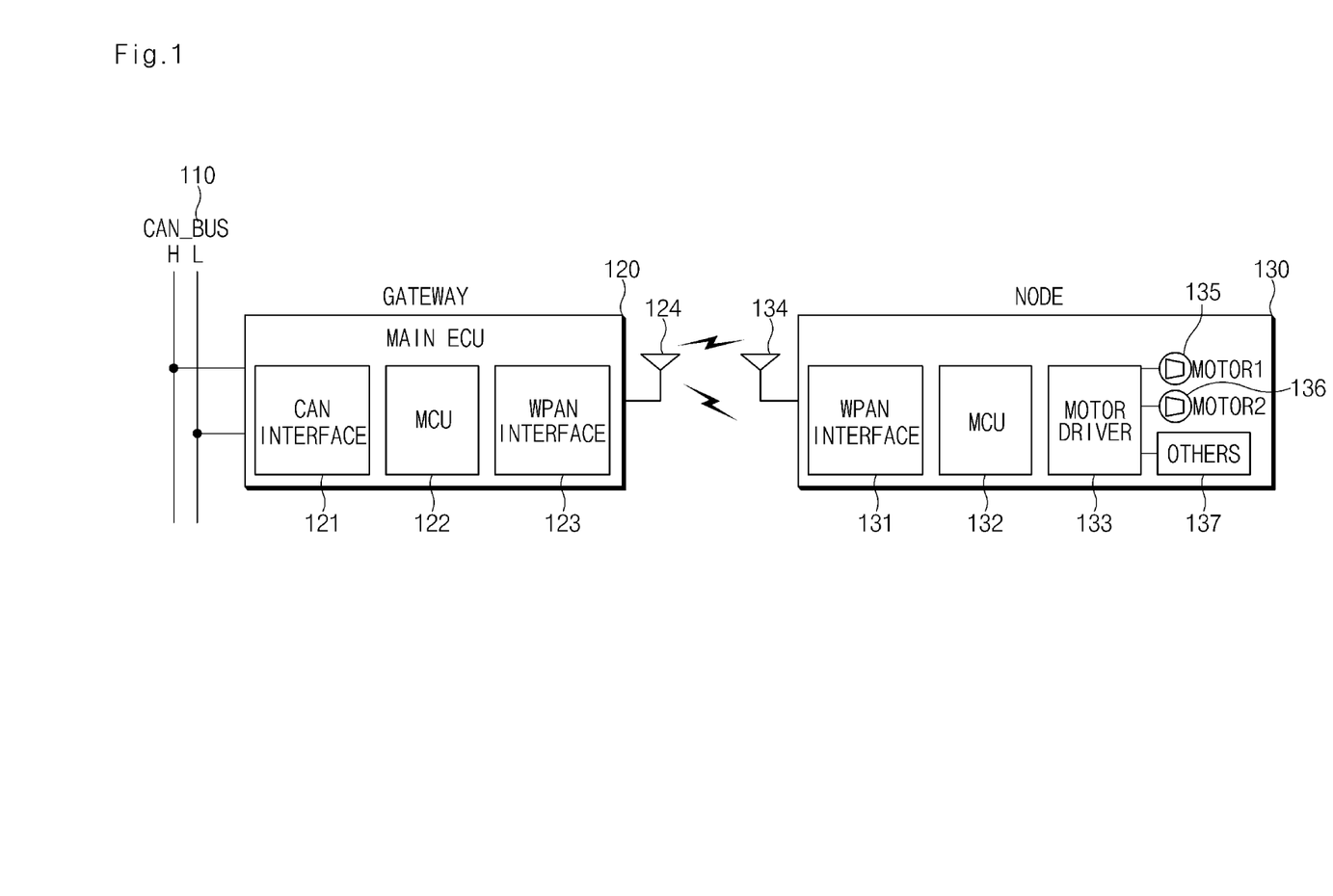
FIG. 1 is a diagram illustrating a wireless network system using a CAN communication method included in a vehicle.

FIG. 1 is a diagram illustrating a wireless network system using a CAN communication method included in a vehicle. Referring to FIG. 1, a gateway 120 and a node 130 are connected with each other by using near field wireless communication technology (WPAN) to exchange data (information). Further, the gateway 120 is connected to a CAN BUS 110.

The gateway 120 includes a CAN interface 121, an MCU 122, a WPAN interface 123, and an antenna 124. The CAN interface 121 is connected with the CAN BUS 110, and transmits CAN communication data received from the CAN BUS 110 to the MCU 122. The WPAN interface 123 and the MCU 122 convert the received CAN communication data to data for WPAN wireless communication, and transmit the converted WPAN data to the node 130 through the antenna 124.

The node 130 includes the antenna 134, the WPAN interface 131, the MCU 132, a motor driver 133, a motor 1 135, a motor 2 136, and other configurations 137. The WPAN interface 131 receives the WPAN data transmitted from the gateway 120 through the antenna 134. The MCU 132 and the motor driver 133 control the motor 1 135 and the motor 2 136 according to the received WPAN data. Here, the other configurations 137 may be a memory, a control table, and the like necessary for driving the motors 135 and 136 by the motor driver 133.

Power for driving the gateway 120 and the node 130 is supplied through a battery of a vehicle. Power may be supplied to the gateway 120 and the node 130 through direct connection of the gateway 120 and the node 130 with the battery, or through batteries of the gateway 120 and the node 130 provided to be indirectly connected with the battery. Finally, since the amount of power supplied in the vehicle is limited in both methods, a power management function for making the gateway 120 and the node 130 minimally use power is essentially demanded.

Accordingly, it is possible to control a size of transmission power of a signal output by the wireless communication device (for example, the gateway, a relay node, a sensor node, and a control node) by using a priority of an arbitration ID included in a data message used in CAN communication through the power management function. Further, the present invention may independently use an existing power management function, or use the power management function together with an existing power management function.

Figure 2:
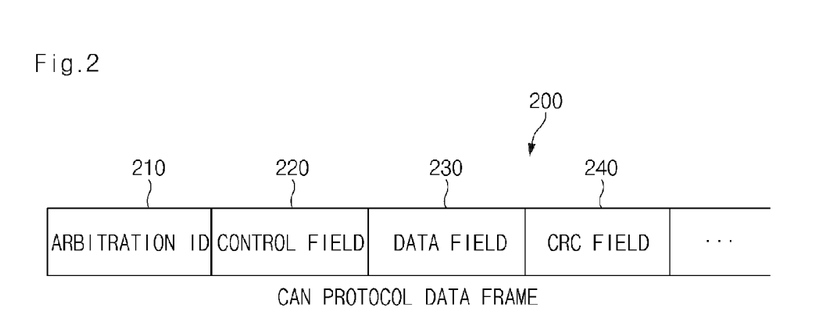
FIG. 2 is a diagram illustrating a CAN protocol data frame used in an exemplary embodiment of the present invention.

FIG. 2 is a diagram illustrating a CAN protocol data frame used in an exemplary embodiment of the present invention. A CAN protocol data frame 200 includes a control field 220, a data field 230, a CRC field 240, and other fields. Particularly, the CAN protocol data frame 200 includes an arbitration ID 210 for discriminating data, and when the arbitration ID 210 is used, it is possible to determine priorities between pieces of data. Here, the arbitration ID 210 is generally configured by 11 bits and an expanded type thereof may be configured by 19 bits.

Particularly, the arbitration ID of the CAN protocol data used in a vehicle may be used for the purpose of discriminating specific data in the plurality of pieces of data. That is, the plurality of pieces of data has different arbitration IDs, respectively. For example, the arbitration ID of the data informing opening of a door of a driver's seat may have a value of 78A which is a hexadecimal value, and the arbitration ID of the data informing closing of a door of a passenger's seat may have a value of 78B which is a hexadecimal value.

Further, the arbitration ID of the CAN protocol data may be sequentially arranged according to importance of corresponding data. Further, when relative importance of the data is higher, the arbitration ID has a smaller value. For example, an arbitration ID of data regarding a temperature of a coolant of the vehicle has a smaller value than that of an arbitration ID of the data regarding the opening/closing of the door. Accordingly, when the arbitration ID is read, it is possible to discriminate CAN data including a corresponding arbitration ID, and determine priority according to a necessity.

Figure 3:
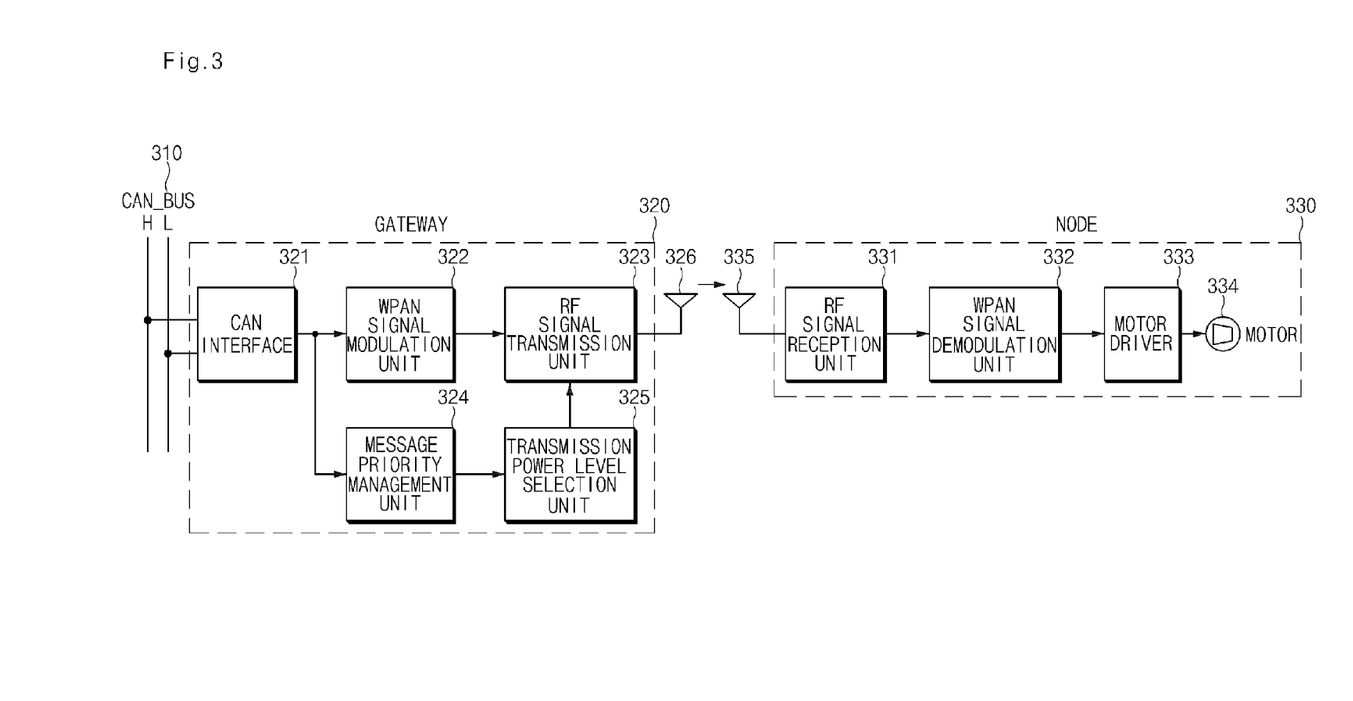
FIG. 3 is a diagram illustrating a device for controlling transmission power in CAN communication according to an exemplary embodiment of the present invention.

FIG. 3 is a diagram illustrating a device for controlling transmission power in CAN communication according to an exemplary embodiment of the present invention. Referring to FIG. 3, a gateway 320 and a node 330 are connected with each other by using near field wireless communication technology (for example, the WPAN) to exchange data. Further, the gateway 320 is connected to a CAN BUS 310.

The gateway 320 includes a CAN interface 321, a WPAN signal modulation unit 322, an RF signal transmission unit 323, a message priority management unit 324, a transmission power level selection unit 325, and an antenna 326.

The CAN interface 321 is connected with the CAN BUS 310, and receives CAN data from the CAN BUS 310. The CAN interface 321 transmits the received CAN data to the WPAN signal modulation unit 322 and the message priority management unit 324.

The WPAN signal modulation unit 322 receives CAN data, which is transmitted from another system through the CAN BUS 310, from the CAN interface 321, and modulates the received CAN data into a signal for WPAN wireless communication.

The message priority management unit 324 receives CAN data, which is transmitted from another system through the CAN BUS 310, from the CAN interface 321, and reads an arbitration ID included in the received CAN data. Through the read arbitration ID, the message priority management unit 324 may discriminate a function which the received CAN data has, and determine a priority of the received CAN data.

The transmission power level selection unit 325 determines a transmission power level so as to output the received CAN data to the node 330 according to the priority of the CAN data determined by the message priority management unit 324.

Particularly, the transmission power level may be in proportion to the priority of the read arbitration ID. That is, when the priority of the CAN data is relatively high, the CAN data is output to the node 330 by using transmission power having a greater transmission power level than a transmission power level at which the CAN data having a lower priority is output. Accordingly, a reception success rate of the corresponding data may be increased. By contrast, when the priority of the CAN data is relatively low, the CAN data is output to the node 330 by using transmission power having a smaller transmission power level than a transmission power level at which the CAN data having a higher priority is output. As a result, the corresponding CAN data may be transmitted to the node 330 by using minimal transmission power. Here, the transmission power level selection unit 325 may determine a transmission power level for radiating a modulated WPAN signal among a plurality of preset transmission power levels according to the priority (for example, a transmission power level table).

Accordingly, the transmission power level is controlled according to the priority as described above, it is possible to efficiently use limited power according to the present invention.

The RF signal transmission unit 323 receives the WPAN signal modulated by the WPAN signal modulation unit 322, and receives the transmission power level from the transmission power level selection unit 325. The RF signal transmission unit 323 outputs the modulated WPAN signal to the node 330 through the antenna 326 according to the transmission power level received from the transmission power level selection unit 325.

The node 330 includes an antenna 335, an RF signal reception unit 331, a WPAN signal demodulation unit 332, a motor driver 333, and a motor 334.

The RF signal reception unit 331 receives the WPAN signal output from the gateway 320 and transmits the received WPAN signal to the WPAN signal demodulation unit 332 through the antenna 335.

The WPAN signal demodulation unit 332 demodulates the WPAN signal received from the RF signal reception unit 331 and transmits the demodulated WPAN signal to the motor driver 333.

The motor driver 333 controls the motor 334 so that the motor 334 performs a corresponding operation according to the demodulated WPAN signal.

In the above description, the WPAN method has been described as an example of the particular wireless communication method, and the motor is described as the operation target, but they are exemplary configurations for describing the present invention in detail, and the scope of the present invention is not limited thereto.

Figure 4:
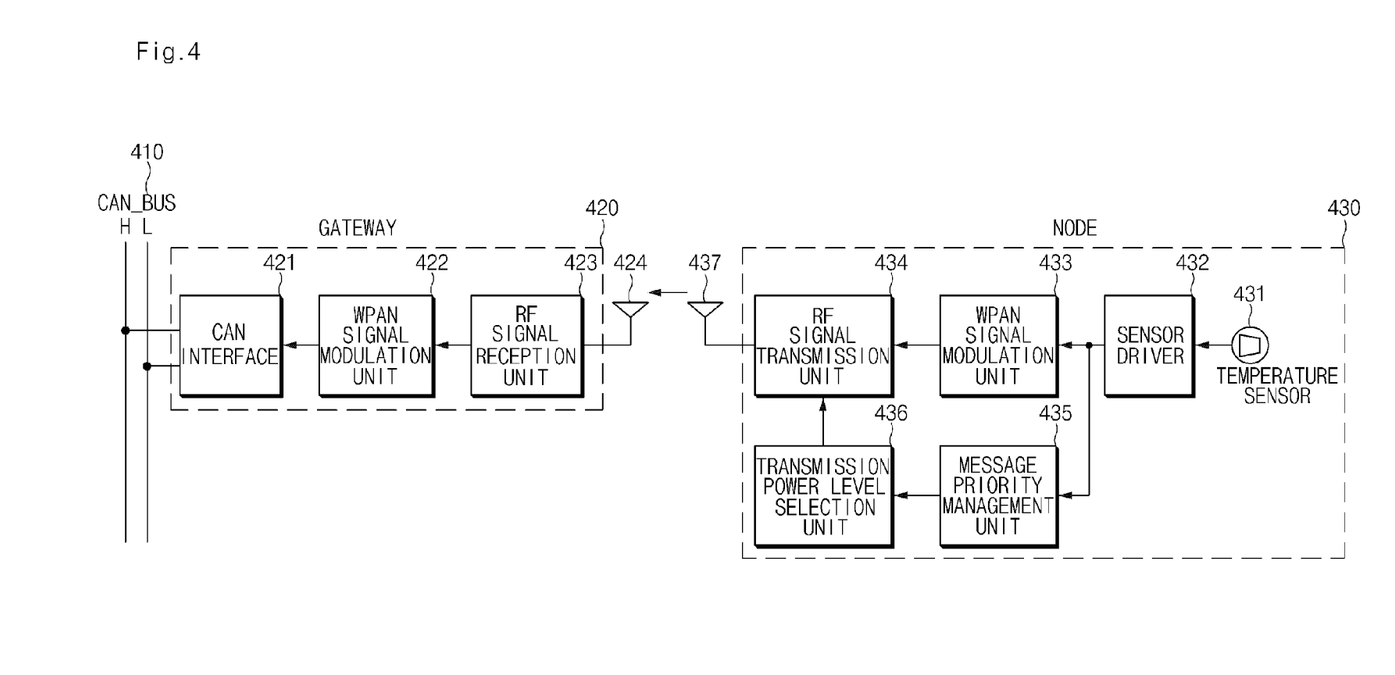
FIG. 4 is a diagram illustrating a device for controlling transmission power in CAN communication according to another exemplary embodiment of the present invention.

FIG. 4 is a diagram illustrating a device for controlling transmission power in CAN communication according to another exemplary embodiment of the present invention. Referring to FIG. 4, a gateway 420 and a node 430 are connected with each other by using near field wireless communication technology (for example, the WPAN) to exchange data. Further, the gateway 420 is connected to a CAN BUS 410.

The node 430 includes a temperature sensor 431, a sensor driver 432, a WPAN signal modulation unit 433, an RF signal transmission unit 434, a message priority management unit 435, a transmission power level selection unit 436, and an antenna 437.

The sensor driver 432 is connected with the temperature sensor 431, and receives temperature data about a temperature from the temperature sensor 431. Here, the temperature data is CAN data for CAN communication. The sensor driver 432 transmits the received temperature data to the WPAN signal modulation unit 433 and the message priority management unit 435.

The WPAN signal modulation unit 433 receives the temperature data, which is transmitted from the temperature sensor 431, from the sensor driver 432, and modulates the received temperature data into a signal for WPAN wireless communication.

The message priority management unit 435 receives the temperature data, which is transmitted from the temperature sensor 431, from the sensor driver 432, and reads an arbitration ID included in the received temperature data. Through the read arbitration ID, the message priority management unit 435 may discriminate a function which the received CAN data has, and determine a priority of the received CAN data as previously described in detail with reference to FIG. 2.

The transmission power level selection unit 436 determines a transmission power level so as to output the received temperature data to the gateway 420 according to the priority of the temperature data determined by the message priority management unit 435.

Particularly, the transmission power level may be in proportion to the priority of the read arbitration ID. That is, when the priority of the temperature data is relatively high, the temperature data is output to the gateway 420 by using transmission power having a greater transmission power level than a transmission power level at which the temperature data having a lower priority is output. Accordingly, a reception success rate of the corresponding data may be increased. By contrast, when the priority of the temperature data is relatively low, the temperature data is output to the gateway 420 by using transmission power having a smaller transmission power level than a transmission power level at which the temperature data having a higher priority is output. As a result, the corresponding temperature data may be transmitted to the gateway 420 by using minimal transmission power. Here, the transmission power level selection unit 436 may determine a transmission power level for radiating a modulated WPAN signal among a plurality of transmission power levels preset according to the priority (for example, a transmission power level table).

Accordingly, the transmission power level is controlled according to the priority as described above, it is possible to efficiently use limited power according to the present invention.

The RF signal transmission unit 434 receives the WPAN signal modulated by the WPAN signal modulation unit 433, and receives the transmission power level from the transmission power level selection unit 436. The RF signal transmission unit 434 outputs the modulated WPAN signal to the gateway 420 through the antenna 437 according to the transmission power level received from the transmission power level selection unit 436.

The gateway 420 includes an antenna 424, an RF signal reception unit 423, a WPAN signal demodulation unit 422, and a CAN interface 421.

The RF signal reception unit 423 receives the WPAN signal output from the node 430 through the antenna 424 and transmits the received WPAN signal to the WPAN signal demodulation unit 422.

The WPAN signal demodulation unit 422 demodulates the WPAN signal received from the RF signal reception unit 423 to a CAN signal and transmits the demodulated signal to the CAN interface 421.

The CAN interface 421 transmits the demodulated CAN signal to the CAN BUS 410.

In the above description, the WPAN method has been described as an example of the particular wireless communication method, and the temperature sensor is described as the operation target, but they are exemplary configurations for describing the present invention in detail, and the scope of the present invention is not limited thereto.

Figure 5:
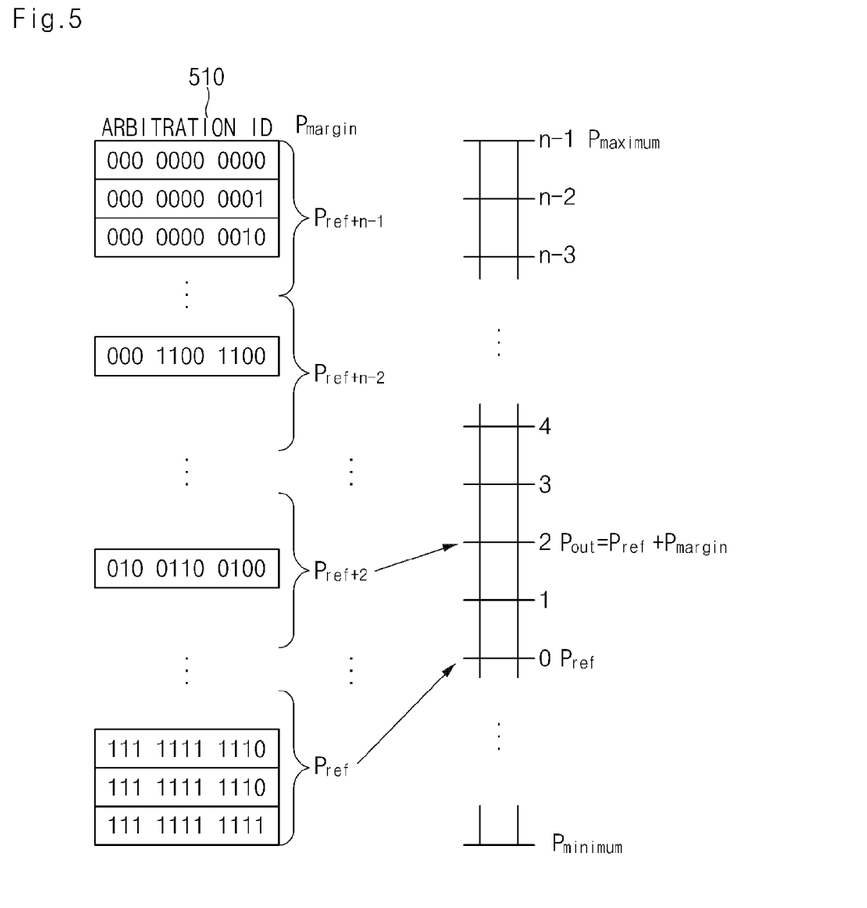
FIG. 5 is a diagram illustrating a method of selecting a transmission power level according to a priority of an arbitration ID in a device and a method of controlling transmission power in CAN communication according to another exemplary embodiment of the present invention.

FIG. 5 is a diagram illustrating a method of selecting a transmission power level according to a priority of an arbitration ID in the device and the method of controlling transmission power in CAN communication according to another exemplary embodiment of the present invention.

Referring to FIG. 5, an arbitration ID 510 may be configured by 11 bits, has 2048 arbitration IDs. Further, $P_{ref}$ indicates a reference (initial) transmission power level of the RF signal transmission unit, and means a minimum RF transmission power level so as to satisfy a transmission error rate demanded in wireless communication. $P_{minimum}$ and $P_{maximum}$ indicate a minimal transmission power level and a maximum transmission power level of physically available output by the RF signal transmission unit, respectively, and $P_{minimum}$ and $P_{maximum}$ may be determined according to a wireless communication operation regulation of each country or an RF communication device.

Particularly, a method of determining a transmission power level according to a priority of an arbitration ID will be described. The transmission power level may be mapped according to priority. First, $P_{ref}$, which is the reference transmission power level, is determined, and a section between $P_{ref}$ to $P_{maximum}$ is divided into N sections (herein, N may be an integer equal to or greater than 1). Then, the 2048 arbitration IDs having 11 bits are divided into N groups. Further, the divided N transmission power levels are arranged in order and mapped with the arbitration IDs divided into the N groups. Then, when the arbitration ID of the CAN data is read, the order of the group, to which the corresponding arbitration ID is included, among the N previously divided groups, is determined, and a section of the transmission power level mapped with the corresponding group is determined. Then, a transmission power level ($P_{out}$) is finally determined by adding a margin ($P_{margin}$) of the transmission power level mapped with the corresponding group to $P_{ref}$ which is the reference transmission power level.

Figure 6:
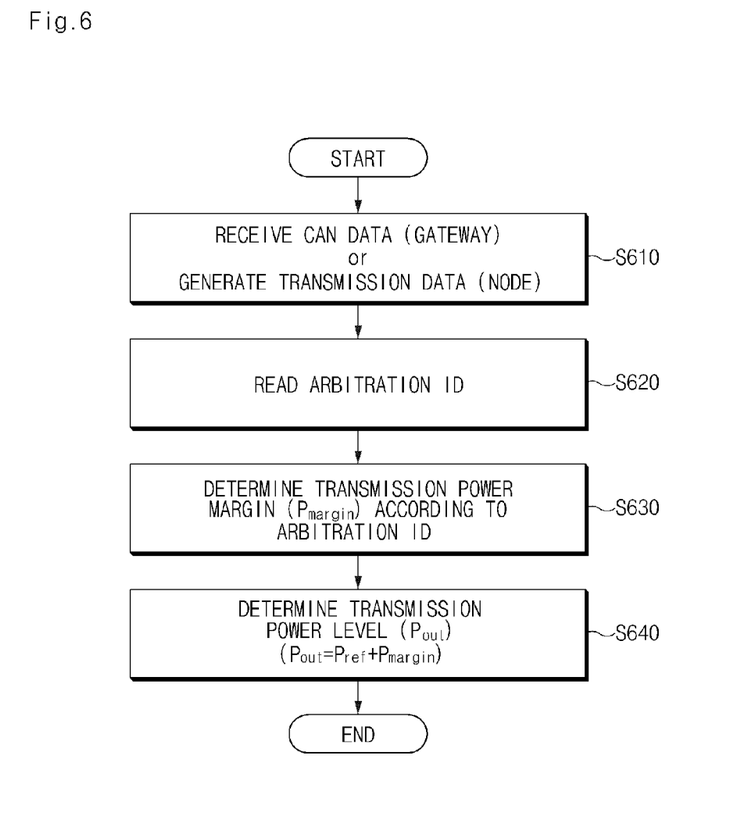
FIG. 6 is a flowchart illustrating a method of controlling transmission power in CAN communication according to another exemplary embodiment of the present invention.

FIG. 6 is a flowchart illustrating a method of controlling transmission power in CAN communication according to another exemplary embodiment of the present invention. Referring to FIG. 6, the method of controlling transmission power in CAN communication includes operations S610 to S640.

First, the gateway receives CAN data from the CAN BUS. Further, the node generates transmission data which is to be transmitted to the CAN BUS (S610).

Then, the CAN data transmitted from the CAN BUS and an arbitration ID included in the generated transmission data are read (S620).

Then, a transmission power margin ($P_{margin}$) is determined according to the arbitration ID read in operation S620. As previously described in detail with reference to FIGS. 2 3, and 4, priority of the corresponding data is determined through the read arbitration ID, and then the transmission power margin is determined according to the corresponding priority.

Then, a transmission power level ($P_{out}$) is determined by adding the transmission power margin ($P_{margin}$) determined in operation S630 to the reference transmission power level ($P_{ref}$).

Finally, according to the device and the method of controlling transmission power in CAN communication, it is possible to discriminate the plurality of pieces of CAN data by assigning a priority to the plurality of pieces of CAN data according to importance, output important data with a relatively greater transmission power level according to the priority, and output less important data with a lower transmission power level, thereby efficiently managing the amount of power used of the entirety of the wireless communication system, and increasing a power use time of the gateway or the node.

As described above, the present invention has been described with reference to the exemplary embodiment of the present invention, but those skilled in the art will understand that the present invention may be variously modified and changed within the scope without departing from the spirit and the area of the present invention defined in the claims. Accordingly, the scope of the present invention should not be limited to and defined by the aforementioned exemplary embodiment, and should be defined by the accompanying claims and equivalents thereof. In consideration of the aforementioned contents, if a change and a modification of the present invention belong to the scope of the claims below and the equivalents thereof, the present invention is considered to include the change and the modification of the present invention.

What is claimed is:

1. A device for controlling data transmission power in CAN communication, comprising:
    a controller area network (CAN) interface configured to receive transmitted data through a CAN BUS;
    a message priority management unit configured to read an arbitration ID included in the received data, and determine priority of the received data; and
    a transmission power level selection unit configured to determine a data transmission power level according to the priority.

2. The device of claim 1, further comprising:
    a signal modulation unit configured to modulate the received data into a signal for wireless communication; and
    an RF signal transmitter configured to wirelessly radiate the modulated signal according to the determined data transmission power level.

3. The device of claim 2, wherein the wireless communication is WPAN wireless communication, and
    the signal modulation unit modulates the received data into a WPAN signal.

4. The device of claim 3, wherein the transmission power level selection unit determines the data transmission power level for radiating the modulated WPAN signal among a plurality of preset data transmission power levels according to the priority.

5. The device of claim 1, wherein the arbitration ID classifies the priority by 11 bits or 19 bits, and is sequentially arranged according to importance of the received data.

6. A device for controlling data transmission power in CAN communication, comprising:
    a data generation unit configured to generate data which is to be transmitted to a CAN BUS;
    a message priority management unit configured to read an arbitration ID included in the generated data, and determine a priority of the generated data; and
    a transmission power level selection unit configured to determine a data transmission power level according to the priority.

7. The device of claim 6, further comprising:
    a signal modulation unit configured to modulate the generated data into a signal for wireless communication; and
    an RF signal transmitter configured to wirelessly radiate the modulated signal according to the determined data transmission power level.

8. The device of claim 7, wherein the wireless communication is WPAN wireless communication, and
    the signal modulation unit modulates the generated data into a WPAN signal.

9. The device of claim 8, wherein the transmission power level selection unit determines the data transmission power level for radiating the modulated WPAN signal among a plurality of preset data transmission power levels according to the priority.

10. The device of claim 6, wherein the arbitration ID classifies the priority by 11 bits or 19 bits, and is sequentially arranged according to importance of the generated data.

11. A method of controlling data transmission power in CAN communication, comprising:
    reading an arbitration ID included in data used in CAN communication;
    determining a priority of the data through the read arbitration ID;
    determining a data transmission power level based on the priority; and
    transmitting the data at the data transmission power level having been determined based on the priority.

12. The method of claim 11, wherein determining the data transmission power level includes determining a data transmission power margin according to the priority of the data based on the arbitration ID, and
    determining the data transmission power level includes adding the transmission power margin to a present reference power level.

13. The method of claim 11, wherein determining the priority of the data includes determining a function of the data based on the arbitration ID.

14. The method of claim 11, wherein determining the data transmission power level includes selecting a power level from a table of a plurality of power levels based on the priority.

15. The method of claim 11, wherein the data is transmitted wirelessly at the power level having been determined based on the priority.

* * * * *